INVENTOR.
Nils O. Rosaen
BY
*Hauke & Hauke*
ATTORNEYS

United States Patent Office 3,269,540
Patented August 30, 1966

3,269,540
MULTIPLE FILTER DEVICES
Nils O. Rosaen, Bloomfield Hills, Mich.
(1776 E. Nine Mile Road, Hazel Park, Mich.)
Filed Apr. 22, 1963, Ser. No. 274,705
15 Claims. (Cl. 210—132)

The present invention relates to a filtering device having a plurality of filtering elements, and more particularly to such a device having means proportionally increasing fluid flow through secondary filter elements as a primary filter element becomes clogged and more particularly to such a filter device adapted to be submerged in a fluid reservoir during use.

Unless some means is provided for periodically cleaning the filter element of a filtering device in place the element will eventually become clogged necessitating its removal for either replacement or cleaning. In an effort to increase the operating time of fluid systems utilizing filtering devices multiple element filtering devices have been heretofore used. Generally, however, these have proven to be unsatisfactory for the reason that as fluid flow is diverted from the clogged filter element to a clean one a lessening of outlet pressure is produced.

My copending application Serial No. 186,075, filed April 9, 1962 now Patent No. 3,224,583 discloses a multiple filter device in which a substantially constant outlet pressure is maintained as each filter element becomes clogged. The present invention is an improvement of the filter device disclosed in my aforementioned application.

It is an object then of the present invention to provide an improved multiple element filtering device by providing a simply and economically constructed filter device having means proportionally opening fluid flow through secondary filter elements as a primary filter element becomes clogged.

It is another object of the present invention to prevent the rupture of filter elements in a multiple filter device by providing pressure responsive means operable to open a bypass around the filter elements as each becomes clogged.

It is still another object of the present invention to provide an improved multiple filter device by providing a construction for such a device which permits a plurality of filter elements of varying porosity to be utilized and means associated with each such filter element to proportionally open fluid flow through the coarser filter elements as the finer filter elements become clogged.

Still further objects and advantages will readily occur to one skilled in the art to which the present invention pertains and upon reference to the following drawing in which like reference characters refer to like parts throughout the several views and in which.

Figure 1:
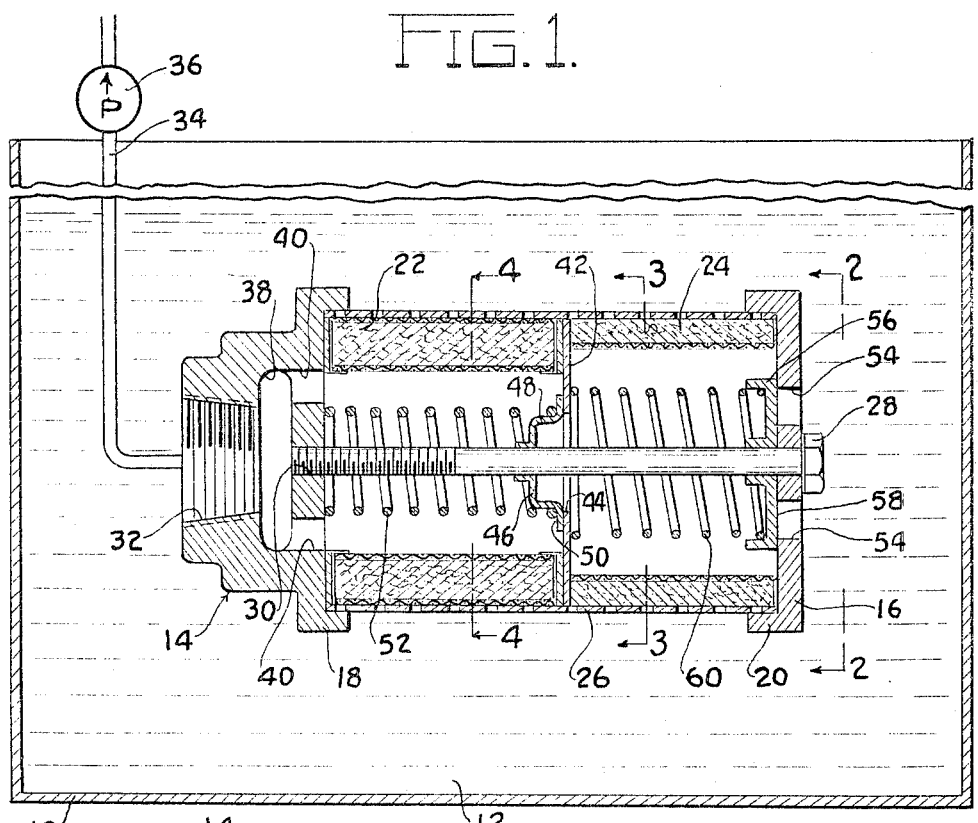
FIG. 1 is a view illustrating a preferred filter device of the present invention in longitudinal cross section and showing schematically a portion of the fluid system utilizing the filter device of the present invention.

Now referring to the drawings for a more detailed description of the present invention a preferred filter device is illustrated in FIG. 1 as being submerged in a reservoir 10 containing fluid 12. The filter device preferably comprises a first annular member 14 and a second annular member 16. The annular members 14 and 16 are provided with axially extending flanges 18 and 20 respectively.

The flanges 18, 20 provide the means by which cylindrical first and second filter elements 22, 24 respectively are sandwiched between the first annular member 14 and the second annular member 16. A perforated cylindrical shell 26 encompasses the filter elements 22, 24. An elongated bolt 28 extends axially through the second annular member 16 and the filter elements 22, 24 and is received by an axial threaded bore 30 provided in the first annular member 14.

The first annular member 14 is provided with an axially extending outlet 32 which is adapted for connection with an outlet pipe 34. The outlet pipe 34 preferably extends exteriorly of the reservoir 10. A fluid pump 36 is preferably connected with the outlet pipe 34. The first member 14 is provided with an annular outlet chamber 38 communicating with the outlet 32. Arcuate slots 40 are provided in the first annular member 14 to provide communication between the outlet side of the first filter element 22 and the outlet chamber 38.

Figure 3:
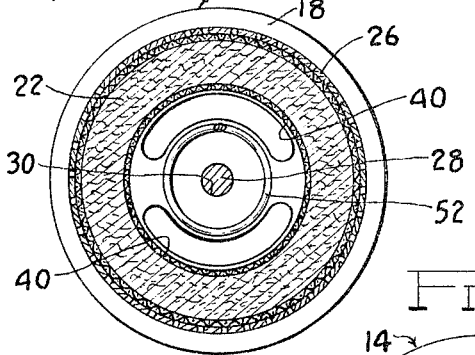
FIG. 3 is a cross sectional view taken substantially on line 3—3 of FIG. 1.

An annular wall 42 is carried intermediate the first filter element 22 and the second filter element 24 and is provided with an annular opening 44 axially aligned with the shank of the bolt 28 as can best be seen in FIGS. 1 and 3. An annular valve plate 46 is slidably carried on the shank of the bolt 28 and is preferably bent to form an axially extending portion 48 spaced from the bolt 28 as shown and a radially extending portion 50 which is of a sufficient diameter to close the opening 44. A spring 52 is seated against the first annular member 14 and engages the valve plate 46 to urge same slidably along the shaft 28 toward the wall 42 to close the opening 44.

Figure 2:
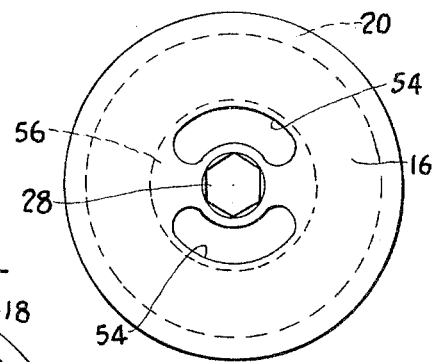
FIG. 2 is an end view as seen substantially from line 2—2 of FIG. 1.
Figure 4:
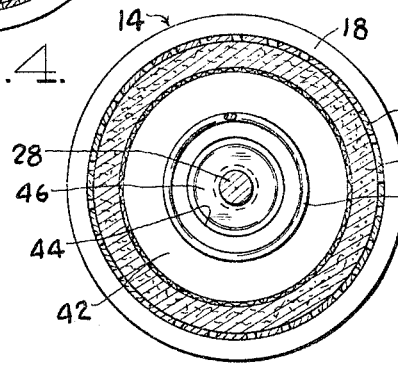
FIG. 4 is a cross sectional view taken substantially on line 4—4 of FIG. 1.

The second annular member 16 is preferably provided with arcuate inlet openings 54 as can best be seen in FIGS. 1–2. A second annular valve plate 56 is slidably carried on the shank of the bolt 28 and is provided with a radially extending face portion 58 of sufficient diameter to close the inlet openings 54. A spring 60 seats against the wall 42 and urges the valve plate 56 toward the annular member 16 to close the inlet openings 54.

In the embodiment illustrated, the filter element 22 is provided with a fine porous surface preferably between 10 and 20 microns and the filter element 24 is somewhat coarser for example 74 to 149 microns. The spring member 52 is somewhat weaker than the spring member 60. For example, in the embodiment illustrated the spring member 22 preferably exerts a force of a value permitting the valve plate 46 to move away from the opening 44 when a pressure differential of about 2 p.s.i. has been produced across the filter element 22 by clogging, while the spring 60 exerts a force of a value permitting the valve plate 56 to move from the openings 54 when a pressure differential of about 4 p.s.i. has been produced across the filter element 24 by clogging.

In operation, when both filter elements 22–24 are clean, the springs 52 and 60 will urge the valve plates 46, 56 respectively to the closed position and fluid will pass through the perforations in the shell 26, through the filter element 22, and out the outlet port 32. The valve plate 46 will prevent any substantial flow from the outlet side of the filter element 24 to the outlet port 32.

As the fine filter element 22 becomes clogged, the pressure on the outlet side of the filter element 22 will decrease to increase the pressure differential across the valve plate 46. When this pressure differential reaches a predetermined value the force of the springs 52 will be overcome and the valve plate 46 will be moved axially on the shank of the bolt 28 to open fluid flow between the outlet side of the filter element 24 and the outlet port 32.

As the coarse filter element 24 becomes clogged, the pressure differential across the valve plate 56 will increase. When this pressure differential has reached a predetermined value and before the filter elements 22–24 are ruptured, the valve plate 56 will be moved axially on the shank of the bolt 28 against the force of the spring 60 to open a bypass path directly from the reservoir 10 through the inlets 54 to the outlet 32.

Since a small amount of fluid will leak past the valve plate 46 even in a closed position the coarse filter element 24 will become partially clogged as the filter element 22 is being used. This means that by the time the valve plate 46 moves to a fully opened position, a cake will have formed on the surface of the filter element 24 which in effect transforms it into a fine filter element.

It is apparent that to vary the amount of clogging necessary to open fluid flow from the outlet side of the filter element 24 and also to open the bypass path, it is only necessary to change the springs 52 and 60. It is also apparent that although it has been preferred to illustrate an embodiment of the present invention which is a submerged type filter device, the invention could take other forms as well.

It is further apparent that a filter device has been disclosed in which any number of filter elements could be used and all that would be necessary would be to replace the bolt 28 with one of a greater length and provide the desired number of walls, valve plates and springs similar to those described. The valves would open in sequence to permit fluid flow through each filter element in sequence.

It is apparent that although I have described but one embodiment of the present invention, several changes and modifications can be made without departing from the spirit of the invention or the scope of the appended claims.

I claim:
1. A filter device adapted to be connected to an outlet pipe and to be submerged in a fluid reservoir, said device comprising
   (a) a filter carrier structure submerged in said reservoir and having an outlet adapted for connection to said outlet pipe,
   (b) said carrier structure comprising a first annular member and a second annular member and a first filter element and a second filter element carried by said structure intermediate said annular members and each having an inlet side exposed to the fluid in said reservoir and an outlet side communicating with said outlet,
   (c) a normally closed valve means carried by said structure intermediate the outlet sides of said filter elements and operable to regulate fluid flow from the outlet side of said second filter element to the outlet side of said first filter element in response to changes in the pressure differential between the outlet sides of said filter elements, and
   (d) said valve means comprising a rod carried by said carrier structure and securing said annular members together and said filter elements therebetween, a wall carried by said carrier structure intermediate said first filter element and said second filter element and having an opening therein, and a valve plate slidably carried on said rod and biasing means urging said valve plate toward a position closing said opening.

2. A filter device adapted to be connected to an outlet pipe and to be submerged in a fluid reservoir, said device comprising
   (a) a filter carrier structure submerged in said reservoir and having an outlet adapted for connection to said outlet pipe,
   (b) said carrier structure comprising a first annular member and a second annular member and a first filter element and a second filter element carried by said structure intermediate said annular members and each having an inlet side exposed to the fluid in said reservoir and an outlet side communicating with said outlet,
   (c) a normally closed valve means carried by said structure intermediate the outlet sides of said filter elements and operable to regulate fluid flow from the outlet side of said second filter element to the outlet side of said first filter element in response to changes in the pressure differential between the outlet sides of said filter elements, and
   (d) a bypass means carried by said structure and operable to open a fluid path directly from said reservoir to the outlet sides of said filter elements upon the pressure differential across said filter elements reaching a predetermined value, and
   (e) said bypass means comprising an inlet means in said structure and providing communication between said reservoir and the outlet side of said second filter element, a rod carried by said carrier structure and securing said annular members together and said filter elements therebetween and a valve plate slidably carried on said rod, and biasing means urging said valve plate toward a position closing said inlet means.

3. A filter device comprising
   (a) a filter carrier structure having an inlet means and an outlet,
   (b) said filter carrier structure comprising a first annular member and a second annular member and a rod securing said annular members together and a first filter element and a second filter element carried by said structure between said annular members and intermediate said inlet means and said outlet, said first filter element being less porous than said second filter element,
   (c) the outlet side of said first filter element being openly connected with said outlet and a normally closed valve means carried by said structure intermediate the outlet side of said second filter element and the outlet side of said first filter element, said valve means being operable to regulate fluid flow from the outlet side of said second filter element to the outlet side of said first filter element and thus to said outlet in response to changes in the pressure differential between the outlet sides of said filter elements whereby fluid flow through said second filter element to said outlet is produced only upon said first filter element becoming clogged to a predetermined degree,
   (d) said valve means comprising
      a wall carried by said structure intermediate said filter elements,
      said wall having an opening therethrough,
      a valve plate carried by said rod and means urging said valve plate toward a position closing said opening, and
   (e) a bypass means carried by said structure intermediate the inlet sides of said filter elements and the outlet side of said second filter element and operable to open a fluid path bypassing both of said filter elements upon the pressure differential across the filter elements reaching a predetermined value.

4. A filter device adapted to be connected to an outlet pipe and to be submerged in a fluid reservoir, said device comprising
   (a) a filter carrier structure submerged in said reservoir and having an outlet adapted for connection to said outlet pipe,
   (b) said carrier structure comprising a first annular member and a second annular member, a rod securing said annular members together and a first filter element and a second filter element carried by said structure intermediate said annular members and each having an inlet side exposed to the fluid in said reservoir and an outlet side communicating with said outlet,
   (c) a normally closed valve means carried by said structure intermediate the outlet sides of said filter elements and operable to regulate fluid flow from the outlet side of said second filter element to the outlet side of said first filter element in response to changes in the pressure differential between the outlet sides of said filter elements, and (d) a bypass means carried by said carrier structure and operable to open a fluid path directly from said reservoir to the outlet sides of each of said filter elements upon the pressure differential across said filter elements reaching a predetermined value.

5. A filter device comprising
(a) a carrier structure having an inlet means and an outlet,
(b) a first filter element and a second filter element carried by said structure intermediate said inlet means and said outlet,
(c) said carrier structure comprising a first annular member, a second annular member, a cylindrical perforated shell sandwiched between said annular members and a rod secured to said annular members and extending axially through said shell to secure said annular members and said shell one to the other,
(d) said perforated shell forming said inlet means and said outlet being provided in said first annular member,
(e) said filter elements being disposed in axially spaced positions within said shell and intermediate said annular members,
(f) the outlet side of said first element being openly connected with said outlet and valve means carried by said rod intermediate said filter elements, said valve means being movable along said rod from a position closing fluid flow from the outlet side of said second filter element to the outlet side of said first filter element to a position opening fluid flow therethrough upon a predetermined increase in the pressure differential across said valve means.

6. The filter device as defined in claim 5 and including
(a) a second inlet means provided in said second annular member and opening to the outlet side of said second filter element,
(b) a bypass value means carried by said rod and normally closing said second inlet means, said bypass valve mean being pressure responsive and movable along said rod from a position closing fluid flow through said second inlet means to a position opening fluid flow therethrough upon a predetermined increase in the pressure differential across said second filter element.

7. The filter device as defined in claim 5 and in which said valve means comprises
(a) a circular wall member carried by said carrier structure within said shell and disposed intermediate said filter elements,
(b) said wall having an opening therethrough,
(c) a valve plate axially slidably carried on said rod within said first filter element and movable between a position opening and a position closing fluid flow through said opening, and
(d) a spring member biased between said first annular member and said valve plate and urging said valve plate along said rod toward a position closing said opening.

8. The filter device as defined in claim 5 with said filter device being adapted to be submerged in a fluid reservoir, (a) said shell being exposed to the fluid within said reservoir whereby fluid from said reservoir passes radially inwardly through said shell and through said filter elements, and
(b) said outlet being adapted for connection to an outlet conduit extending exteriorly of said reservoir.

9. The filter device as defined in claim 3 and in which said bypass means comprises,
(a) a second inlet provided in said structure and communicating with the outlet side of said second filter element,
(b) a second valve plate carried by said structure and means urging said second valve toward a position closing said second inlet means.

10. The filter device as defined in claim 1 and including a bypass means carried by said structure and operable to open a fluid path directly from said reservoir to the outlet sides of each of said filter elements upon the pressure differential across said filter elements reaching a predetermined value.

11. The device as defined in claim 10 and in which said bypass means comprises
(a) an inlet provided in said structure and providing communication between said reservoir and the outlet side of said second filter element,
(b) a second valve plate slidably carried on said rod and a second biasing means urging said second valve plate toward a position closing said inlet.

12. The filter device as defined in claim 11 and in which said first mentioned biasing means exerts a force on said first mentioned valve plate of a lesser value than the force exerted by said second biasing means on said second valve plate whereby upon an increase in the pressure differential across said filter elements said first mentioned valve plate will be moved toward an open position before said second valve plate will begin to move toward an open position.

13. The filter device as defined in claim 12 and in which said first mentioned biasing means comprises a spring seated against said first annular member and urging said first mentioned valve plate toward said wall.

14. The filter device as defined in claim 13 and in which said inlet is provided in said second annular member and in which said second biasing means comprises a spring seated against said wall and urging said second valve plate toward said second annular member.

15. The filter device as defined in claim 14 and in which the force exerted by said second mentioned spring is greater than the force exerted by said first mentioned spring.

References Cited by the Examiner
UNITED STATES PATENTS

| | | | |
|---|---|---|---|
| 619,569 | 2/1899 | Hewel | 210—459 X |
| 2,605,904 | 8/1952 | Ogilvie | 210—132 |
| 2,617,535 | 11/1952 | Hamilton | 210—132 |
| 2,868,382 | 1/1959 | Best | 210—130 X |
| 2,998,138 | 8/1961 | Mould et al. | 210—90 |
| 3,120,490 | 2/1964 | Samson | 210—433 X |

REUBEN FRIEDMAN, *Primary Examiner.*

F. A. SPEAR, *Assistant Examiner.*